United States Patent
Zein et al.

(10) Patent No.: US 11,933,206 B2
(45) Date of Patent: Mar. 19, 2024

(54) METHOD, PROCESSING UNIT, AND COMPUTER PROGRAM FOR DETERMINING A CONVERSION CAPABILITY OF AN EXHAUST GAS CATALYTIC CONVERTER

(71) Applicant: Robert Bosch GmbH, Stuttgart (DE)

(72) Inventors: Thomas Zein, Sindelfingen (DE); Jan Kappa, Ludwigsburg (DE); Markus Thanner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/872,616

(22) Filed: Jul. 25, 2022

(65) Prior Publication Data

US 2023/0032803 A1 Feb. 2, 2023

(30) Foreign Application Priority Data

Jul. 29, 2021 (DE) ...................... 10 2021 208 258.0

(51) Int. Cl.
*F01N 11/00* (2006.01)

(52) U.S. Cl.
CPC ........ *F01N 11/005* (2013.01); *F01N 2550/02* (2013.01); *F01N 2900/0406* (2013.01); *F01N 2900/1602* (2013.01)

(58) Field of Classification Search
CPC ............... F01N 11/005; F01N 2550/02; F01N 2900/0406; F01N 2900/1602
See application file for complete search history.

(56) References Cited

U.S. PATENT DOCUMENTS

| | | | | |
|---|---|---|---|---|
| 9,506,390 B1* | 11/2016 | Hendrickson | ........... | F01N 9/005 |
| 9,909,517 B2* | 3/2018 | Kothandaraman | | ........................ F02D 41/2422 |
| 2008/0282787 A1* | 11/2008 | Odendall | .............. | F01N 11/005 60/274 |
| 2014/0032189 A1* | 1/2014 | Hehle | .................... | G16C 10/00 703/2 |
| 2015/0101317 A1* | 4/2015 | Phillips | ................. | F01N 13/008 60/299 |
| 2018/0258885 A1* | 9/2018 | Trimboli | ................. | F01N 9/005 |
| 2019/0120113 A1* | 4/2019 | Muthukaruppan | ... | F01N 3/2066 |

FOREIGN PATENT DOCUMENTS

| DE | 41 32 814 A1 | 4/1993 |
|---|---|---|
| DE | 195 04 208 A1 | 8/1995 |

* cited by examiner

*Primary Examiner* — Matthew T Largi
(74) *Attorney, Agent, or Firm* — NORTON ROSE FULBRIGHT US LLP; Gerard A. Messina

(57) ABSTRACT

A method for determining a conversion capability of one or multiple exhaust gas catalytic converters, downstream from an internal combustion engine. The method includes ascertaining a respective local temperature at multiple locations within the one or the multiple catalytic converters, ascertaining a local conversion capability for a section or a partial volume of the one or the multiple catalytic converters based on the local temperature, and ascertaining a global conversion capability of the one or the multiple catalytic converters based on the ascertained local conversion capabilities. A processing unit and a computer program product for carrying out such a method are also described.

11 Claims, 2 Drawing Sheets

METHOD, PROCESSING UNIT, AND COMPUTER PROGRAM FOR DETERMINING A CONVERSION CAPABILITY OF AN EXHAUST GAS CATALYTIC CONVERTER

FIELD

The present invention relates to a method for determining a conversion capability of an exhaust gas catalytic converter as well as to a processing unit and to a computer program for carrying out the method.

BACKGROUND INFORMATION

Catalytic converters are used in exhaust gas systems of gasoline and diesel engines for converting the gaseous harmful substances (e.g., hydrocarbons (HC), carbon monoxide (CO), nitrogen oxides ($NO_x$)). These catalytic converters ensure an almost complete conversion of these harmful substances in the warmed-up operating state. Chemical reactions take place in the catalytic converter in the process. For example, HC and CO are oxidized to $CO_2$ and water. $NO_x$ is reduced to $N_2$.

For these catalytic reactions to take place as intended, the temperatures in the catalytic converter must in general exceed the so-called light-off temperature of typically 300° C.-400° C. (in the case of a three-way catalytic converter (TWC)). As soon as this temperature is reached or exceeded, the catalytic converter almost completely converts the relevant harmful substances. In connection with diesel engines, other catalytic converter types, e.g., oxidation catalytic converters or SCR catalytic converters, may also be used, which must also be operated in a respective temperature range for an effective exhaust gas treatment.

To achieve this state as quickly as possible, so-called engine-internal catalytic converter heating measures must be employed. In this process, e.g., the efficiency of the gasoline engine is worsened by late ignition angles, and the exhaust gas temperature and the enthalpy input into the catalytic converter are thus increased. As a result of adapted injection strategies (e.g., multiple injections), the combustion stability may be ensured at the same time.

In addition to these engine-internal catalytic converter heating measures, external catalytic converter heating measures may also be used, for example with the aid of electrically heatable catalytic converters or exhaust gas burners. Such external heating measures are described, for example, in German Patent Nos. DE 41 32 814 A1 and DE 195 04 208 A1.

SUMMARY

According to the present invention, a method for determining a conversion capability of an exhaust gas catalytic converter downstream from an internal combustion engine as well as a processing unit and a computer program for carrying out the method, are provided. Advantageous example embodiments of the present invention are disclosed herein.

The present invention provides an approach for determining a feature for characterizing the instantaneous capability of the catalytic converter system to convert harmful substances. Based on this feature, it is then possible to carry out measures for heating the catalytic converter or for controlling the internal combustion engine accordingly. For this purpose, an example embodiment of the present invention utilizes the measure of determining local conversion capabilities for sections or partial volumes of the catalytic converter based on local temperatures, and determining a global or overall conversion capability of the catalytic converter or of the entire exhaust gas system (including multiple individual catalytic converters) therefrom. Since the catalytic converters have a certain thermal capacity, not the entire catalytic converter volume will suddenly reach the thermal operating window simultaneously after the start of the internal combustion engine. Rather, the exhaust gas system, including the catalytic converters, will heat through in the flow direction from the front to the back, and the conversion-capable catalytic converter volume will thus incrementally increase over the course of time. The catalytic converter heating measures as well as motor-related limitations may thus also be successively adapted corresponding to this progression to avoid impermissible emissions.

In detail, the method according to an example embodiment of the present invention for determining a conversion capability of one or multiple exhaust gas catalytic converters, downstream from an internal combustion engine, includes ascertaining a respective local temperature at multiple locations or partial volumes within the one or the multiple catalytic converters, ascertaining a local conversion capability for a section or a partial volume of the one or the multiple catalytic converters based on the local temperature, and ascertaining a global conversion capability of the one or the multiple catalytic converters based on the local conversion capabilities. This results in a more precise assessment of the conversion capability than is the case in conventional systems which are based on an average temperature of the catalytic converter or catalytic converters.

In particular, the multiple locations or partial volumes may differ from one another in their axial position and/or radial position with respect to a main flow direction through the one or the multiple catalytic converters. This, in particular, takes the explained gradual heating of the catalytic converter or catalytic converters into consideration.

According to an example embodiment of the present invention, the ascertainment of the global conversion capability of the one or the multiple catalytic converters may, in particular, encompass a weighting of the local conversion capabilities as a function of a maximum possible contribution by the respective partial volume to the global conversion capability. In this way, locally differing circumstances, which affect the general conversion capability, such as, for example, a local cell density or a locally differing catalytic converter loading, may be taken into consideration.

According to an example embodiment of the present invention, the ascertainment of the local conversion capabilities and/or of the global conversion capability is advantageously carried out as a function of an aging parameter of the one or the multiple catalytic converters since, with increasing catalytic converter aging, higher operating temperatures are required to achieve a consistent conversion performance.

In the process, the aging parameter and/or the dependence of the conversion capability on the temperature is preferably determined separately for each of the multiple locations or each partial volume. In this way, it is possible, for example, to take different aging rates in different locations into consideration, which may be caused by different temperature histories. For example, a lower average temperature will in general prevail in a radially outer area of a catalytic converter than in a radially inner area, since heat is given off via the outer surface of the particular catalytic converter, and the cooling effect of the surroundings thus plays a greater role on the outside than on the inside. It is also possible, via locally different dependencies between the temperature and the conversion capability, to take differences in the catalytic converter coating and/or geometry into consideration. For example, catalytic converters in a radially outer zone may include more catalytically active material than in a radially inner zone. Similar differences may also exist in an axial direction. It is also possible for different catalytically active materials to be provided in different catalytic converter zones to catalyze different reactions or to be effective at different concentrations of harmful substance components in the exhaust gas.

According to an example embodiment of the present invention, the local conversion capability may, in particular, be ascertained based on a functional or characteristic-defined dependence of a conversion rate on the local temperature. The conversion rate may, for example, have an essentially sigmoidal profile over the catalytic converter temperature so that, proceeding from low temperatures, only negligibly few conversion reactions take place at the catalytic converter, the conversion rate then, however, increases very steeply, with increasing temperature, before stabilizing at a high value (maximum conversion rate). In the process, a minimum temperature for a sufficient conversion capability may, for example, be defined based on an inflection point of the conversion rate over the temperature or as a temperature at which the conversion rate reaches a threshold value, for example a threshold value which is at least 50%, 75%, 90%, 95% or 99% of the maximum conversion rate. In other words, in this way, a parameter which describes the conversion capability of the particular catalytic converter may thus be ascertained from the specific light-off curve of the catalytic converter.

The local temperature is advantageously in each case ascertained with the aid of a sensor and/or with the aid of a calculation rule based on one or multiple input variables, the one or multiple input variables encompassing, in particular, an exhaust gas temperature and/or an exhaust gas composition and/or an operating parameter of the internal combustion engine, in particular, an operating point, an air-fuel mixture composition, an ignition angle, and a rotational speed. Sensor-based temperatures are, in general, very exact during stationary operation, however, it being necessary for a separate sensor to be provided for each location or each partial volume, resulting in relatively high investment costs in the process. A model-based ascertainment of the temperatures is more cost-effective, combined methods also being possible and advantageous since, in such a case, the precision of the sensor-based measurement may be rendered usable for the model calculation. Corresponding catalytic converter models are conventional.

In advantageous example embodiments of the present invention, the method may be carried out for at least two catalytic converters of an exhaust gas system of an internal combustion engine, and may include ascertaining an overall conversion capability of the exhaust gas system based on the determined global conversion capabilities of each of the at least two catalytic converters. In this way, the method may be utilized for monitoring and/or controlling the entire exhaust gas system, which entails corresponding advantages with respect to the emission behavior.

In advantageous embodiments of the present invention, the method furthermore includes carrying out a measure for adapting a catalytic converter temperature, in particular, one or multiple measures from the group of engine-internal heating measures, in particular, ignition angle adjustment, coasting prohibition, lambda splitting, exhaust gas recirculation and mixture enrichment, and external heating measures, in particular, operation of an exhaust gas burner, electrical catalytic converter heater and secondary air introduction, as a function of the local and/or global conversion capability or of the overall conversion capability. The conversion capability may thus be deliberately increased as needed, in particular, in a location-based manner, which positively affects the efficiency of the heating measures and the emission behavior of the exhaust gas system. For example, regions of the catalytic converter which have a low local conversion capability may be deliberately heated to bring them quickly into the catalytic converter window, while regions of the catalytic converter which already have a high local conversion capability do not need to be heated, or only need to be heated using low heating power. In particular, the heating measures may be selected in such a way that preferably the locations or partial volumes having a low local conversion capability are heated. For example, an electrical heating jacket is able to heat radially outer areas more quickly, while engine-internal heating measures act better on areas which are situated, in the radial direction, close to the center of the catalytic converter and, in the axial direction, at the input of the catalytic converter.

As an alternative or in addition, a need-based limitation of the permissible operating range of the internal combustion engine as a function of the local and/or global conversion capability or the overall conversion capability may take place, the limitation encompassing, in particular, a reduction of a selectable rotational speed range and/or rotational speed gradient range and/or torque range and/or torque gradient range. In this way, the untreated emissions of the internal combustion engine may be lowered in the case of an exhaust gas system which is not yet (fully) conversion-capable, to avoid excessive pollution of the environment with non-converted harmful substances.

According to an example embodiment of the present invention, a processing unit according to the present invention, e.g., a control unit of a motor vehicle, is configured, in particular from a programming point of view, to carry out a method according to the present invention.

In addition, the implementation of a method according to the present invention in the form of a computer program or a computer program product having program code for carrying out all method steps is advantageous since this incurs particularly low costs, in particular when an executing control unit is also used for additional tasks and is therefore present anyhow. Finally, a machine-readable memory medium is provided, including a computer program as described above stored thereon. Suitable memory media or data media for providing the computer program are, in particular, magnetic, optical and electrical memories, such as hard disks, flash memories, EEPROMs, DVDs, and the like. It is also possible to download a program via computer networks (Internet, Intranet, and the like). Such a download may take place via a hard-wired or cable connection, or wirelessly (e.g., via a WLAN network, a 3G, 4G, 5G or 6G connection, etc.).

Further advantages and embodiments of the present invention are derived from the description and the figures.

The present invention is schematically shown based on one exemplary embodiment in the figures and is described hereafter with reference to the figures.

DETAILED DESCRIPTION OF EXAMPLE EMBODIMENTS

Figure 1:
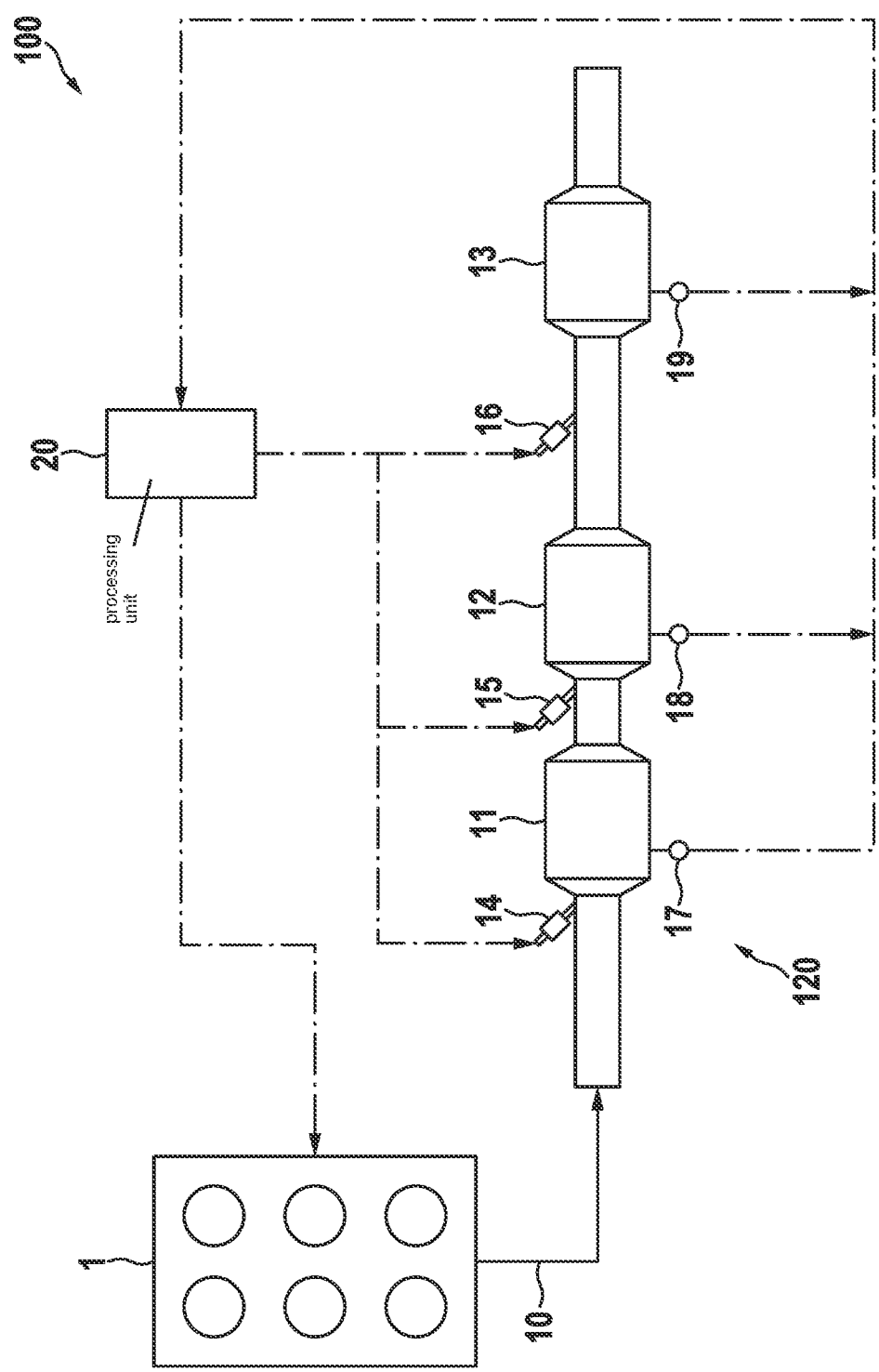
FIG. 1 shows an exhaust gas system, as it may be used within the scope of the present invention, in a simplified schematic illustration.

FIG. 1 schematically shows an arrangement including an exhaust gas system, as it may be used within the scope of the present invention, which is denoted overall by reference numeral 100.

Arrangement 100 includes an internal combustion engine 1 and multiple catalytic converters 11, 12, 13 situated in an exhaust gas system 120 downstream from internal combustion engine 1. In the illustrated example, a respective temperature sensor 17, 18, 19 is assigned to each of catalytic converters 11, 12, 13, sensors 17, 18, 19 each being connected in a data-conducting manner to a processing unit 20, for example a control unit of a motor vehicle which includes arrangement 100.

In the illustrated example, processing unit 20 is furthermore connected in a data-conducting manner to internal combustion engine 1 as well as external devices 14, 15, 16 of exhaust gas system 120, for example secondary air supply lines, exhaust gas burners, reducing agent metering units, electrical heating elements, or the like, which are each assigned to one of catalytic converters 11, 12, 13. In particular, electrical heating elements may also be situated directly in the catalytic converter or within a housing of the catalytic converter.

An exhaust gas 10 generated by internal combustion engine 1 is consecutively supplied to catalytic converters 11, 12, 13 of exhaust gas system 120 to be treated or detoxified therein. In the process, each of catalytic converters 11, 12, 13 may in each case be intended for a certain detoxification or for multiple simultaneous detoxifications. For example, a first catalytic converter 11 (e.g., in the case of a gasoline engine), which may be situated close to internal combustion engine 1, may be designed as a three-way catalytic converter (TWC), while a second 12 and third 13 catalytic converter may include other catalytic converters and/or treatment components, such as $NO_x$ storage catalytic converters, SCR catalytic converters, particulate filters, or the like. Second and third catalytic converters 12, 13, however, may also include one or multiple further TWC. Furthermore, the first catalytic converter 11 may also include one or multiple other treatment components, and does not necessarily have to be configured as a TWC.

Depending on the particular catalytic converter type, each of catalytic converters 11, 12, 13 has a specific thermal operating range, which is also referred to as a conversion window. For the effective conversion, a predetermined minimum (operating) temperature must be reached in the process, which is also referred to as a light-off temperature. Above the light-off temperature, a conversion of the particular harmful substances into less harmful substances takes place to a considerable extent. If necessary, however, an increase in effectiveness may be achieved when the particular catalytic converter is operated at a temperature which is higher than the light-off temperature. If necessary, a conversion may also already take place below the light-off temperature, however in general to a significantly lesser extent than is the case above the light-off temperature. The conversion rate may, for example, follow a sigmoidal function or a profile similar thereto over the temperature.

Since each catalytic converter 11, 12, 13 has a certain thermal capacity, not the entire catalytic converter volume will suddenly reach the thermal operating window simultaneously. Rather, the catalytic converter 11, 12, 13 will heat through in the flow direction from the front to the back, and the conversion-capable catalytic converter volume will thus gradually increase over the course of time.

Figure 2:
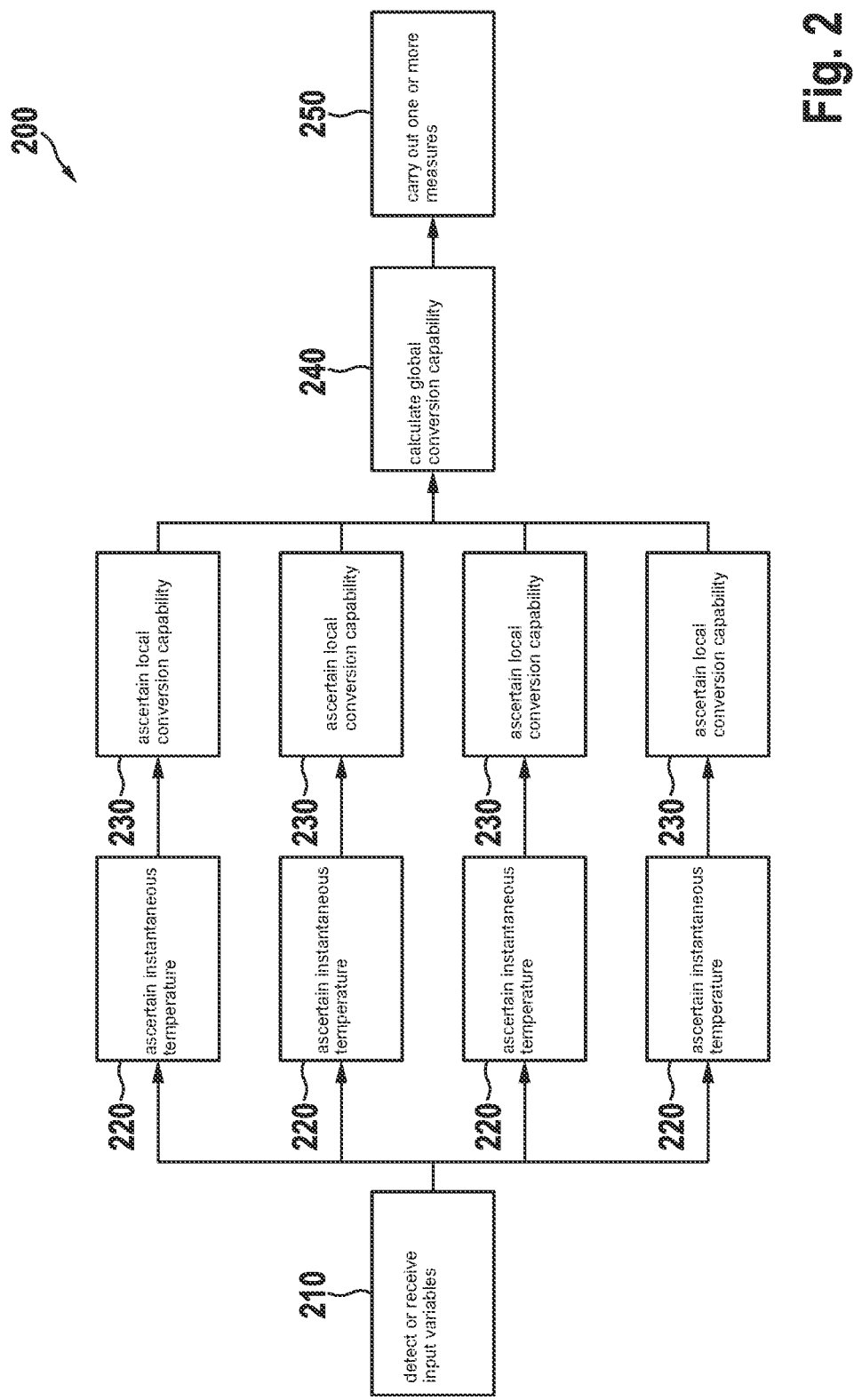
FIG. 2 shows an advantageous example embodiment of a method according to the present invention in the form of a highly simplified flowchart.

FIG. 2 schematically shows one advantageous embodiment of a method according to the present invention in the form of a simplified flowchart which is denoted overall by reference numeral 200.

The shown example of method 200 is based on a model-based temperature determination. References to device components within the scope of the explanation of method 200 relate, in particular, also to arrangement 100 from FIG. 1.

In a first step 210 of method 200, input variables for the temperature ascertainment are detected or received. These input variables may, for example, encompass an instantaneous operating point (e.g., rotational speed and torque) of internal combustion engine 1, an, in particular combustion chamber-specific, composition of an air-fuel mixture supplied to internal combustion engine 1, an ignition angle of internal combustion engine 1, an exhaust gas mass flow downstream from internal combustion engine 1, an instantaneous temperature at one or multiple predetermined locations (e.g., temperature sensors 17, 18, 19) within exhaust gas system 120 downstream from internal combustion engine 1, as well as further relevant parameters.

In a calculation step 220, instantaneous temperatures are ascertained, based on the input variables for multiple partial volumes or locations as sections within one or multiple of catalytic converters 11, 12, 13. For example, these partial volumes may represent disks situated axially behind one another. In the drawing, this ascertainment is indicated by way of example for four locations or partial volumes by a quadruplication of step 220 (as well as of subsequent step 230), i.e., the catalytic converter is modeled by four such disks. For this purpose, in particular, a physical model of the respective catalytic converter 11, 12, 13 may be used, into which, in particular, fluidic properties of catalytic converter 11, 12, 13 as well as thermal properties, such as thermal capacity, thermal conductivity, or the like, of catalytic converter 11, 12, 13, internal combustion engine 1 as well as of exhaust gas 10 are incorporated. These properties may be permanently stored in a data memory of processing unit 20, for example in the form of one or multiple characteristic maps, lookup tables, parameter sets, or the like.

In an ascertainment step 230, the local conversion capabilities are ascertained from the local temperatures thus ascertained, with the aid of dependencies (e.g., the above-mentioned light-off curve) of the conversion rate on the local temperature which are valid for the particular location or the corresponding partial volume. In the process, the dependence depends, in particular, on the type of catalytic converter 11, 12, 13 as well as an aging of the catalytic converter, since different temperatures are required for different conversion reactions to be catalyzed, and the conversion efficiency in general decreases with increasing catalytic converter aging. The aging of catalytic converter 11, 12, 13 may, for example, be ascertained within the scope of a diagnostic function, and be taken into consideration in the form of an aging parameter. The aging parameter may apply globally for the entire affected catalytic converter 11, 12, 13, or may also be ascertained as a function of the location, since, for example, lower temperatures prevail in an edge zone of the catalytic converter than in a core zone of catalytic converter 11, 12, 13, and the core zone thus ages more quickly than the edge zone. For example, a respective parameter set or characteristic map may be stored for different aging states, it being possible to interpolate between these data sets corresponding to the ascertained aging parameter. As an alternative, a single present light-off curve may also be shifted on the temperature axis with the aging parameter. The conversion rate profiles stored in processing unit 20 may, for example, be ascertained from component characteristic values (e.g., by the catalytic converter manufacturer or coater), a model, from measurements, or a combination thereof.

In one embodiment of the present invention, the ascertainment step may also encompass comparing the local temperature to a local minimum temperature (which results from the above-mentioned dependence), above which a noteworthy catalysis efficiency may be expected at the respective position within the particular catalytic converter. The minimum temperatures may also be location-dependent in the process when, for example, catalytic converter 11, 12, 13 does not homogeneously over the entire catalytic converter volume have the same composition and/or density with respect to the catalytically active materials. For example, a lower minimum temperature may be assumed when a high density of catalytically active material is present since the catalyzed reactions are, in general, exothermic, and a self-reinforcing effect may thus already arise even at a lower conversion rate, since the first occurring reactions further heat the catalytic converter, and this effect acts more strongly in regions having a high catalytic converter density than in regions having a low catalytic converter density. Based on the local comparison results, it is then also possible to ascertain a conversion capability of the catalytic converter for each of the locations or for each partial volume.

The conversion capability may, for example, be obtained as a numerical value standardized to 1, a conversion capability of 1 being assignable to a location or partial volume, where, based on the instantaneous temperature there, a maximum possible conversion rate may be expected, while a conversion capability of 0 may be assigned to a location or partial volume in which, due to an excessively low temperature, no catalysis of conversion reaction is able to take place. As mentioned at the outset, the conversion rate does not necessarily increase suddenly from 0 to the maximum at an exactly determinable temperature, but may, for example, follow a sigmoidal profile over the temperature, so that the conversion capability may also take on values between 0 and 1, and, in particular, may also increase further in a temperature range above the minimum temperature.

In a step 240, a global conversion capability is calculated from the local conversion capabilities, as they were obtained in step 230. For this purpose, for example, a volume fraction of catalytic converter 11, 12, 13 which is already above the particular light-off temperature may be determined, or a mean value may be formed of the standardized conversion capabilities. For this purpose, in particular, the individual pieces of information are weighted, depending on the volume fraction of the respective partial volumes in the overall catalytic converter volume, or as a function of the portion which the respective partial volume is able to contribute to the entire harmful substance conversion based on its size, coating, cell density, and the like. In advantageous embodiments of method 200, it is also possible to ascertain spatially resolved distributions of conversion capabilities within the respective catalytic converter as the global conversion capability. In step 240, an overall conversion capability may also be ascertained for the entire exhaust gas system 120 downstream from internal combustion engine 1 to obtain an indicator for an emission behavior of the entire arrangement 100.

In a control step 250, one or multiple measures are carried out based on the local conversion capabilities or the global conversion capability for the temperature maintenance of catalytic converter 11, 12, 13, in particular, such measures being selected which increase the conversion capability in a localized manner where it is the lowest. For example, an electrical catalytic converter heating unit which heats a jacket of catalytic converter 11 may be activated when edge areas of catalytic converter 11 have a low local conversion capability, while a core zone of catalytic converter 11 has a high local conversion capability. On the other hand, it may be more advantageous to take engine-internal heating measures (e.g., ignition angle retardation, lambda split, etc.) when the edge area already has a high local conversion capability, the core zone, however, has a low local conversion capability.

In particular, these measures 250 make it possible to rapidly establish the conversion capability following a cold start of internal combustion engine 1. As an alternative or in addition, however, they may also be used at a later point in time of a driving cycle, e.g., when cooling during coasting operation is to be prevented (so-called keeping-warm of catalytic converter), or when the temperature of a catalytic converter 11, 12, 13 is to be regulated. In such situations, possibly also a combination with catalytic converter-specific heating measures, such as, e.g., electrically heatable catalytic converter (E-cat) or exhaust gas burner, or regeneration air injection upstream from the catalytic converter may take place. In this way, it is possible, e.g., to keep the second catalytic converter 12 of exhaust gas system 120 in a certain optimal temperature window, which could quite possibly differ from the optimal temperature window of the first catalytic converter 11 in system 120.

Furthermore, in the case of a low global conversion capability of one of catalytic converters 11, 12, 13 or a low overall conversion capability of exhaust gas system 120, a permissible operating range of internal combustion engine 1 may be limited, for example in that a maximally selectable torque or a maximally selectable rotational speed or also a rotational speed gradient or torque gradient is lowered or limited, to limit the untreated emissions of internal combustion engine 1 during times in which exhaust gas system 120 is not conversion-capable or only conversion-capable to a limited extent.

It shall be understood that method 200 described here does not have to be configured in the illustrated form as an incrementally progressing method 200. Rather, some of the "steps" may also be carried out in parallel to one another, simultaneously and/or essentially continuously. The incremental sequence was only selected to provide a better understanding of the explanations and shall, in no way, be understood to be limiting.

What is claimed is:

1. A method for an exhaust gas system that includes one or multiple exhaust gas catalytic converters downstream from an internal combustion engine, the method comprising the following steps:
    ascertaining a respective local temperature at each of multiple locations within the one or multiple catalytic converters;
    ascertaining, for each respective one of a plurality of sections or partial volumes of the one or multiple catalytic converters, a respective instantaneous local expected conversion capability of the respective section or partial volume, wherein the ascertainment of the respective local expected conversion capabilities is based on the ascertained respective local temperatures of the multiple locations;

ascertaining an instantaneous global expected conversion capability of the one or multiple catalytic converters as a whole based on a combination of the ascertained local expected conversion capabilities; and controlling, based on the ascertained instantaneous global expected conversion capability, an operation of at least one of (a) the one or multiple exhaust gas catalytic converters, (b) components that affect an operability of one or multiple exhaust gas catalytic converters according to the operation of the components, and (c) the internal combustion engine.

2. The method as recited in claim 1, wherein the ascertainment of the global conversion capability of the one or multiple catalytic converters includes weighting the local conversion capabilities as a function of a maximum possible contribution by the respective sections or partial volumes to the global conversion capability.

3. The method as recited in claim 1, wherein each of the respective local temperatures is ascertained using: (i) a sensor, and/or (ii) a calculation rule based on one or multiple input variables, the one or multiple input variables including an exhaust gas temperature and/or an exhaust gas composition and/or an operating point of the internal combustion engine and/or an air-fuel mixture composition of the internal combustion engine and/or an ignition angle of the internal combustion engine and/or a rotational speed of the internal combustion engine.

4. The method as recited in claim 1, wherein the multiple locations differ from one another in their axial position and/or radial position, with respect to a main flow direction through the one or the multiple catalytic converters.

5. The method as recited in claim 1, wherein the ascertainment of the local conversion capability and/or of the global conversion capability takes place as a function of an aging parameter of the one or of the multiple catalytic converters.

6. The method as recited in claim 1, wherein:
the one or multiple catalytic converters includes at least two catalytic converters of the exhaust gas system of the internal combustion engine;
the ascertainment of the respective local temperatures of multiple locations is performed for each of respective sets of the multiple locations, each of the sets corresponding to a respective one of the at least two catalytic converters;
the ascertainment of the respective local expected conversion capabilities is performed respectively for each of respective sets of the plurality of sections or partial volumes which respective set is part of a respective one of the at least two catalytic converters;
the ascertainment of the global expected conversion capability is performed respectively for each of the at least two catalytic converters, so that a respective global expected conversion capability is ascertained for each of the at least two catalytic converters; and
the method further comprises ascertaining an overall conversion capability of the exhaust gas system based on the determined global conversion capabilities of each of the at least two catalytic converters.

7. The method as recited in claim 1, wherein the controlling includes carrying out a measure for adapting a catalytic converter temperature, including carrying out one or multiple measures from a group of engine-internal heating measures including at least one of the following:
ignition angle adjustment,
coasting prohibition,
lambda splitting,
exhaust gas recirculation and mixture enrichment, and
external heating measures including operation of an exhaust gas burner, electrical catalytic converter heating, and secondary air introduction.

8. The method as recited in claim 1, wherein the controlling includes limiting a permissible operating range of the internal combustion engine, the limitation including a reduction of a selectable rotational speed range and/or rotational speed gradient range and/or torque range and/or torque gradient range.

9. The method as recited in claim 1, wherein each of the instantaneous local expected conversion capabilities and the instantaneous global expected conversion capability is a value with a range of 0 to 1.

10. A processing unit for an exhaust gas system that includes one or multiple exhaust gas catalytic converters downstream from an internal combustion engine, the processing unit configured to:
ascertain a respective local temperature at each of multiple locations within the one or the multiple catalytic converters;
ascertain, for each respective one of a plurality of sections or partial volumes of the one or multiple catalytic converters, a respective instantaneous local expected conversion capability of the respective section or partial volume, wherein the ascertainment of the respective local expected conversion capabilities is based on the ascertained respective local temperatures of the multiple locations; and
ascertain an instantaneous global expected conversion capability of the one or the multiple catalytic converters as a whole based on a combination of the ascertained local expected conversion capabilities; and
control, based on the ascertained instantaneous global expected conversion capability, an operation of at least one of (a) the one or multiple exhaust gas catalytic converters, (b) components that affect an operability of one or multiple exhaust gas catalytic converters according to the operation of the components, and (c) the internal combustion engine.

11. A non-transitory machine-readable memory medium on which is stored a computer program for an exhaust gas system that includes one or multiple exhaust gas catalytic converters downstream from an internal combustion engine, wherein the computer program is executable by a processing unit and, when executed by the processing unit, causes the processing unit to perform the following steps:
ascertaining a respective local temperature at each of multiple locations within the one or multiple catalytic converters;
ascertaining, for each respective one of a plurality of sections or partial volumes of the one or multiple catalytic converters, a respective instantaneous local expected conversion capability of the respective section or partial volume, wherein the ascertainment of the respective local expected conversion capabilities is based on the ascertained respective local temperatures of the multiple locations;
ascertaining an instantaneous global expected conversion capability of the one or multiple catalytic converters as a whole based on a combination of the ascertained local expected conversion capabilities; and controlling, based on the ascertained instantaneous global expected conversion capability, an operation of at least one of (a) the one or multiple exhaust gas catalytic converters, (b) components that affect an operability of one or multiple exhaust gas catalytic converters according to the operation of the components, and (c) the internal combustion engine.

\* \* \* \* \*